United States Patent [19]

Hilgendorf et al.

[11] Patent Number: 5,355,455
[45] Date of Patent: Oct. 11, 1994

[54] METHOD AND APPARATUS FOR AVOIDING DEADLOCK IN A COMPUTER SYSTEM WITH TWO OR MORE PROTOCOL-CONTROLLED BUSES INTERCONNECTED BY A BUS ADAPTOR

[75] Inventors: Rolf B. Hilgendorf, Boeblingen; Thomas Schlipf, Holzgerlingen, both of Fed. Rep. of Germany

[73] Assignee: International Business Machines Corporation, Armonk, N.Y.

[21] Appl. No.: 171,268

[22] Filed: Dec. 21, 1993

Related U.S. Application Data

[63] Continuation of Ser. No. 794,748, Nov. 19, 1991, abandoned.

[51] Int. Cl.⁵ .................................................. G06F 13/14
[52] U.S. Cl. .................................. 395/325; 364/240; 364/240.2; 364/281.3; 364/281.5; 364/DIG. 1
[58] Field of Search ............. 395/325, 725, 200, 650, 395/275, 425; 340/825.5, 825.51; 370/58.1, 67

[56] References Cited

U.S. PATENT DOCUMENTS

| | | | |
|---|---|---|---|
| 3,947,818 | 3/1976 | Kobayashi | 340/825.5 |
| 4,403,285 | 9/1983 | Kikuchi | 364/200 |
| 4,449,183 | 5/1984 | Flahive et al. | 395/425 |
| 4,494,193 | 1/1985 | Brahm et al. | 364/200 |
| 4,602,327 | 7/1986 | LaViolette et al. | 364/200 |
| 4,737,932 | 4/1988 | Baba | 364/900 |
| 4,791,554 | 12/1988 | Hirota et al. | 364/200 |
| 4,868,741 | 9/1989 | Gula et al. | 364/200 |
| 4,935,868 | 6/1990 | DuLac | 364/200 |
| 5,016,167 | 5/1991 | Nguyen et al. | 364/200 |
| 5,121,487 | 6/1992 | Bechtolsheim | 395/325 |
| 5,133,074 | 7/1992 | Chou | 395/725 |
| 5,150,467 | 9/1992 | Hayes et al. | 395/325 |

FOREIGN PATENT DOCUMENTS

| | | | |
|---|---|---|---|
| 0384621A | 8/1990 | European Pat. Off. | G06F 13/36 |
| 2128853A | 5/1984 | United Kingdom | G06F 13/40 |

OTHER PUBLICATIONS

"The 8th Annual Symposium on Computer Architecture" IEEE & Assoc. for Comp. Mach., pp. 107–133, May 12–14, '81.

Primary Examiner—Gopal C. Ray
Attorney, Agent, or Firm—Arthur J. Samodovitz

[57] ABSTRACT

A method and an apparatus to avoid a deadlock in a computer system with several busses connected by a bus adapter. If units of different busses of the computer system simultaneously start operations for which more than one bus is needed, it may come to a deadlock. By introducing a BUS SUSPEND signal to one of the busses and adapting the bus-protocol to honor this signal at distinct time slots, deadlock situations are avoided.

8 Claims, 5 Drawing Sheets

METHOD AND APPARATUS FOR AVOIDING DEADLOCK IN A COMPUTER SYSTEM WITH TWO OR MORE PROTOCOL-CONTROLLED BUSES INTERCONNECTED BY A BUS ADAPTOR

This application is a continuation of application Ser. No. 07/794,748, filed Nov. 19, 1991, now abandoned.

BACKGROUND OF THE INVENTION

The subject matter of the present invention pertains to computer systems, and more particularly, to a method and an apparatus for avoiding deadlock in a computer system with two or more protocol-controlled busses connected by a bus adapter, if units of different busses simultaneously start operation for which more than one bus is needed.

In a computer system, various processors and input/output units disposed within the computer system may require access to a common shared data bus at approximately the same time. However, the data bus can handle only one access at a time. Therefore, some mechanism is required for determining which unit and which processor may be granted access to the bus.

Various arbitration mechanisms have been used by computer systems. In an article entitled "Performance Analysis of High-Speed Digital Busses for Multiprocessing Systems" by W. L. Bain and S. R. Ahuja, Bell Laboratories, Murray Hill, N.J., several arbitration mechanisms are discussed. The article discusses, for example, the Static Priority Algorithm, the Fixed Time Slice Algorithm, Dynamic Priority Algorithms including the Least Recently Used Algorithm and the Rotating Daisy Chain Algorithm, and the First Come First Served Algorithm.

Most of the above-mentioned arbitration mechanisms are based on a fixed priority in descending order. None take account of the following special features: dual level input/output (I/O) requests for preventing I/O time-outs, a rotating selectively changeable highest priority at all I/O levels for preventing processor lock-outs, an instruction cache preemptive grant which saves one arbitration cycle, data cache in-page and cast-out operations in one cycle, which saves one arbitration cycle, and Processor Bus Operation (PBO) grants during refresh for utilizing cycles otherwise wasted.

U.S. Pat. No. 4,449,183 to Flahive et al discloses a mechanism for granting access to a shared bus on a "rotating priority basis". However, the arbitration scheme discussed in this patent resembles the rotating daisy chain algorithm mentioned above. There is no mention of the following special features and problems.

In a system with two data busses, where a bus unit of a bus #1 wants to communicate with a bus unit of a bus #2, while a bus unit of bus #2 wants to communicate with another bus unit of bus #1, the following deadlock situations may occur:

1. Both operations have been started and cannot be completed because the other bus is occupied.
2. No operation can be started.

The 1st situation will occur, if use of one bus is granted almost independently of the occupational state of the other bus.

The 2nd situation will occur, if use of a bus is granted only when the other bus is free.

According to the above-mentioned prior art, there are two known ways to solve the problem. Both adversely affect the performance of the system.

By the first method, a higher priority is assigned to one of the busses. An operation on the second bus can start only after both busses have activated their GRANT signals. Operations on the higher priority bus may start whenever this bus is free. This scheme requires several additional bus cycles for each operation started on the low-priority bus.

The second method allows all operations to start whenever their respective bus has issued its GRANT signal. However, whenever the bus coupling device receives two operations which are to be transferred to the other bus, it will cancel one operation. In this case, the cancelled operation has to be started anew after the operation which caused the cancellation has been completed. The performance penalty is only on the cancelled operation, but unduly frequent cancellation, say, in case of register polling, may prompt an operation never to be performed.

Accordingly, a general object of the present invention is to provide a method for avoiding a deadlock in a system with several busses interconnected by a bus adapter, which is universally applicable to a variety of different I/O device busses or adapters therefor.

Another general object of the present invention is to provide an apparatus which comprises less complicated adapters and avoids deadlock situations.

SUMMARY OF THE INVENTION

In one aspect of the present invention, a BUS SUSPEND signal is introduced to one of the busses and the bus protocol is adapted to honor this signal at distinct time-slots, deadlock situations are thereby avoided. The bus arbiter affords effective bus utilization and avoids deadlocks by a new suspend/resume application, using time slots to specify operational details.

BRIEF DESCRIPTION OF THE DRAWINGS

The foregoing and other objects, features and advantages of the invention will be apparent from the following more particular description of the preferred embodiment of the invention as illustrated in the drawings, in which.

DETAILED DESCRIPTION OF THE INVENTION

The invention allows operations to be started independently of each other on both busses. The protocol of one of the busses defines distinct time-slots for each operation, in which the operation may be temporarily suspended. Suspension is controlled by a single bus signal sent from the bus adapter to each bus unit of the respective bus.

If operations are started on both busses to communicate with bus units of the other bus, the bus adapter will sequence them.

Figure 1:
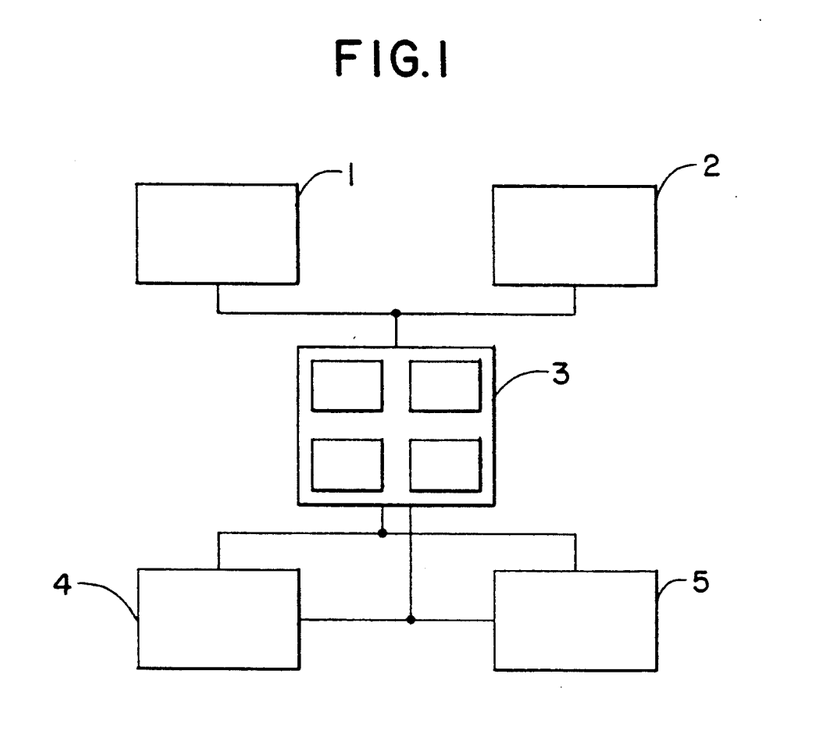
FIG. 1 is a block diagram representation of a system with two bus units on two independent but coupled busses in accordance with the present invention.

FIG. 1 shows an example of a two-bus system. In this system, BU1-B1 1 is the processor, BU1-B2 2 is the system storage, BA 3 is the adapter between both busses, and BU1-B2 4 and BU2-B2 5 are bus units, each of which are IO-controllers.

Features of Bus 1:
the bus lines are multiplexed in between the command and the data cycle;
distinction between command and data cycle by separate validate signals;
one command may be followed by up to 8 data cycles;
BU1-B1 1 and BA 3 may be masters on the bus;
BU1-B1 1 contains the arbiter for the bus.

Features of Bus 2:
the bus lines are multiplexed in between the command and data cycle;
distinction between command and data cycle by separate validate signals;
one command may be followed by up to 8 data cycles;
BU1-B2 4, BU2-B2 5 and BA 3 may be masters on the bus;
BA 3 contains the arbiter for the bus.

The system operates as follows. BU1-B2 4 requests from BA 3 the use of bus-2 to communicate with BU2-B1 2. When BA 3 grants bus-2 to BU1-B2 4, it requests bus-1 from BU1-B1 1. BU1-B2 4 will start the respective operation using bus-2. BU1-B1 1 will grant bus-1 to BA 3 only if it does not intend to use bus-1. To use bus-1, BU1-B1 will simply initiate a command cycle. If BA 3 is waiting for a GRANT on bus-1 and detects a COMMAND VALID on bus-1, it knows that the operation on bus-2 has to be suspended. If the operation on bus-2 is a FETCH or a STORE, for which the data-cycle has not yet been started, BA 3 will activate the SUSPEND signal on bus-2. For a STORE where the data transfer has already been started, BA 3 will wait for the transfer of all data and then issue a SUSPEND signal.

In BA 3, the SUSPEND signal triggers the transfer of the command from bus-1 to bus-2. The direction of data transfer depends on the command. In BU1-B2 4 and BU2-B2 5 receiving the SUSPEND signal, the current operation is interrupted, with these units being switched to a state where they are able to respond to the command on bus-2 as soon as COMMAND VALID is activated. The selected B2-bus unit (in FIGS. 2 to 4 this being invariably BU2-B2 5) will answer the command and either accept or issue data together with the TRANSFER DATA signal. On receipt of the last transfer data, BA 3 will deactivate the SUSPEND signal. After BU1-B1 1 has received the last transfer data on bus-1, it will grant bus-1 to BA 3. The operation originally started by BU1-B2 4 can then be brought to an end.

Figure 2:
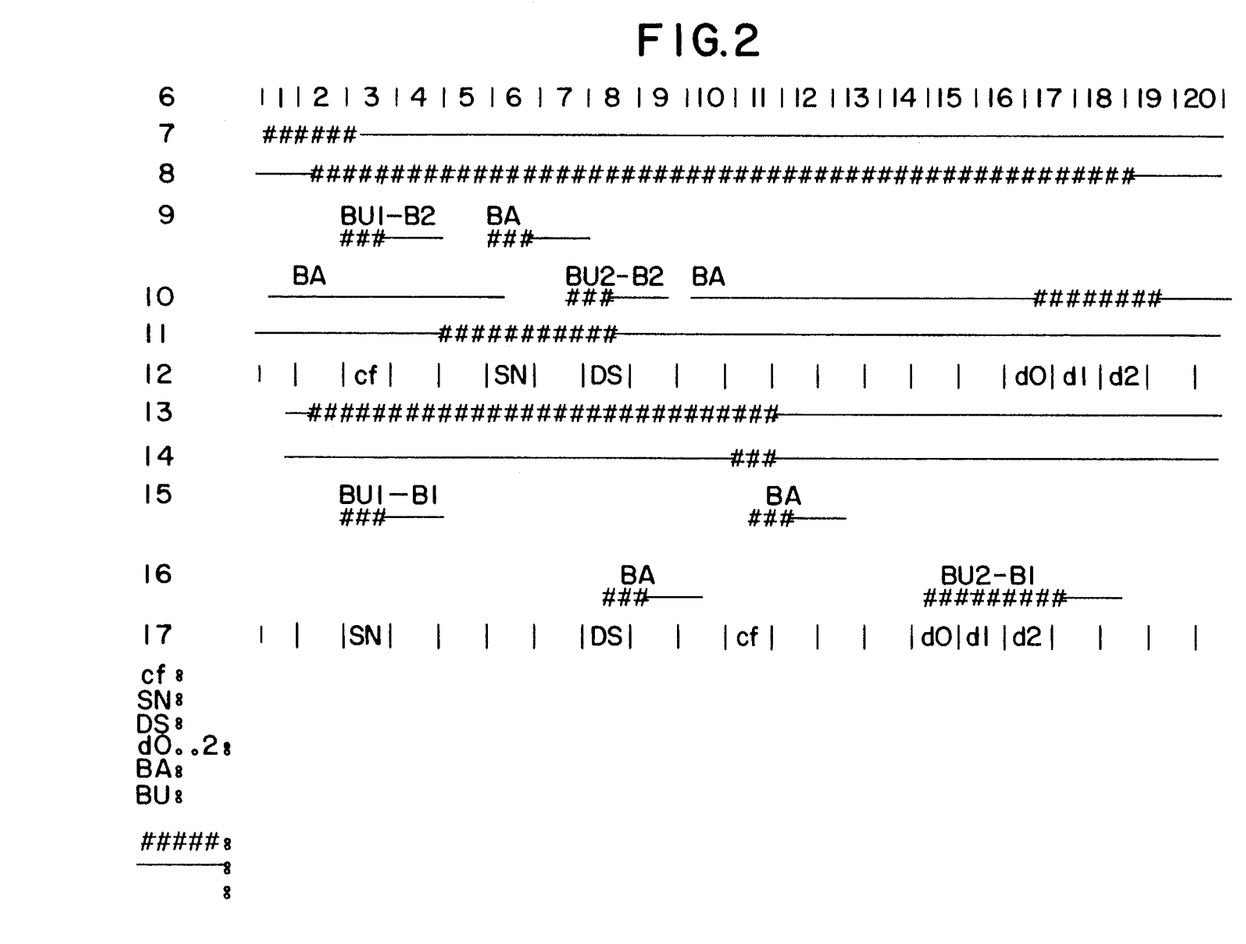
FIG. 2 is a timing diagram of a fetch sequence generated on bus-2 with sense interference generated on bus-1 of FIG. 1.

FIG. 2 shows the protocol for a FETCH and a SENSE started in parallel on both busses. The top line 6 refers to the system clock. Here each vertical bar symbolizes the start of a new clock cycle, the numbers between the bars refer to the sequence number of the cycle. The protocol starts with a request for bus-2 7 in the first cycle. In the 2nd cycle, BA 3 issues GRANT 8 and a request for bus-1 13. In the 3rd cycle, as a result of the GRANT, BU1-B2 4 drops request 7, puts the command on bus-2 12 and issues CMD-Valid 9. In the same cycle, BU1-B1 1 puts a command on bus-1 17 and issues CMD-Valid 15 for this bus. In cycle 4, BA 3 detects the collision. In cycle 5, BA 3 issues the SUSPEND signal 11. In the 6th cycle, BA 3 transfers the command received from bus-1 to bus-2 12 and activates CMD-Valid 9. In cycle 7, bus units on bus-2 4,5 interpret the command. In cycle 8, BU2-B2 5 answers the command by putting data on bus-2 12 and activating TRANSFER DATA 10. In the 9th cycle, BA 3 deactivates SUSPEND 11, putting the data received via bus-2 on bus-1 17 and activating TRANSFER DATA 16 there. After a wait cycle (cycle 10), the BU1-B1 1 issues GRANT 14 to BA 3 in cycle 11. In cycle 12, BA 3 drops it request 13, transferring the command received on bus-2 in cycle 3 to bus-1 17 and issuing the CMD-valid 15. BU2-B1 2 answers this command and sends data to bus-1 17 as well as TRANSFER DATA 16 in cycles 15, 16, and 17. The data is transferred to bus-2 12 and validated by TRANSFER DATA 10 in cycles 17, 18, and 19. BA 3 drops GRANT 8 in cycle 19 to indicate the end of the operation.

Figure 3:
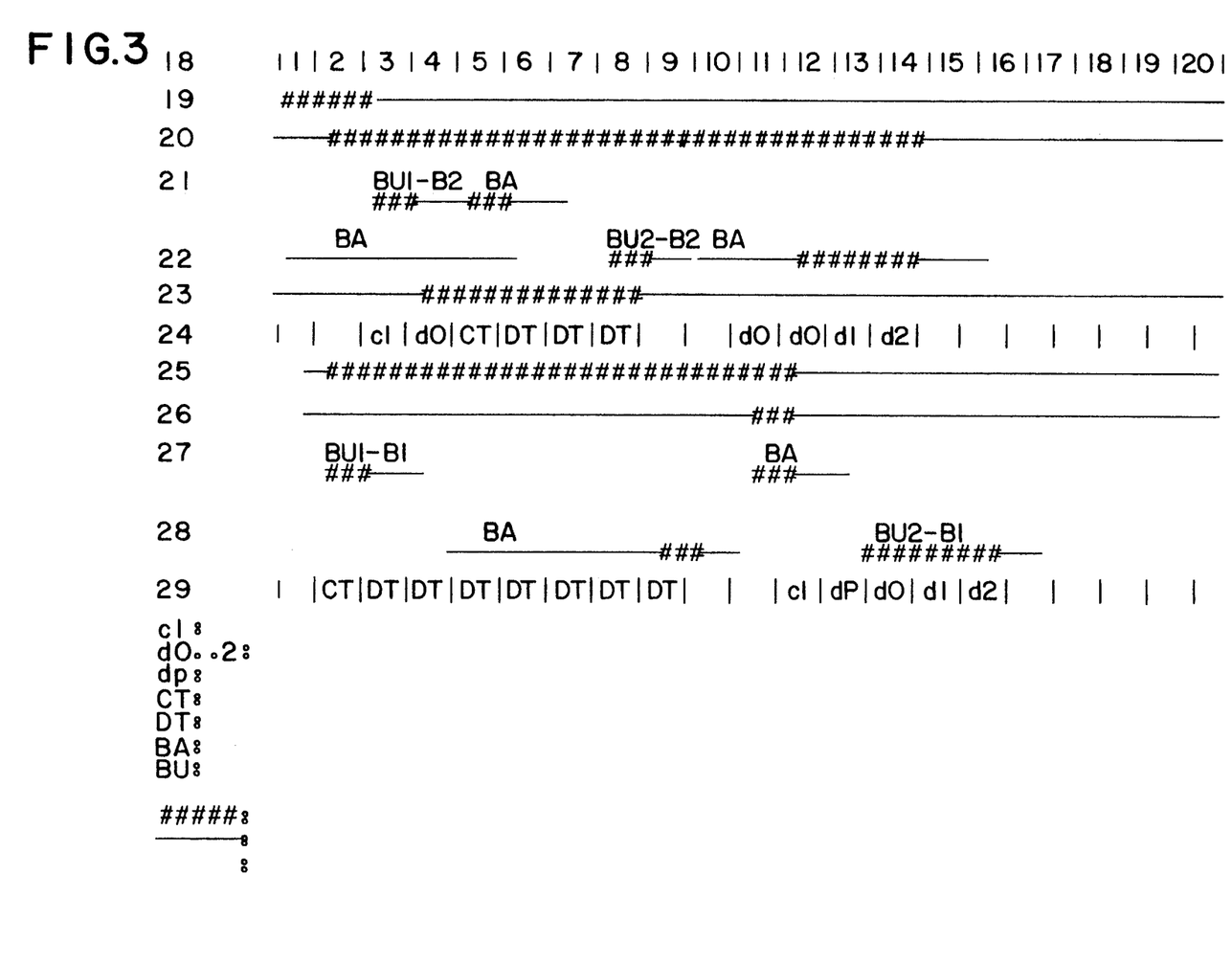
FIG. 3 is a timing diagram of a store sequence generated on bus-2 with control interference generated on bus-1 of FIG. 1.

FIG. 3 shows the protocol for a STORE and a CONTROL started on both busses. The top line 18 refers to the system clock. Here each vertical bar symbolizes the start of a new clock cycle, the numbers between the bars refer to the sequence number of the cycle. The protocol starts with a request for bus-2 19 in the first cycle. In the 2nd cycle, BA 3 issues GRANT 20 and a request for bus-1 25. In the same cycle, BU1-B1 1 puts a command on bus-1 29 and issues CMD-Valid 27 for this bus. In the 3rd cycle, as a result of the GRANT, BU1-B2 4 drops the request 19, putting the command on bus-2 24 and issuing CMD-Valid 21. BA 3 detects the collision in this cycle. In cycle 4, BA 3 issues the SUSPEND signal 23. In the 5th cycle, BA 3 transfers the command received from bus-1 to bus-2 24 and activates CMD-Valid 21. Cycle 6 bus units on bus-2 4,5 interpret the command, while BA 3 transfers the data from bus-1 to bus-2. In cycle 8, BU2-B2 5 answers the command by activating TRANSFER DATA 22. In the 9th cycle, BA 3 deactivates SUSPEND 23, activating TRANSFER DATA 28 on bus-1. After a wait cycle (cycle 10), BU1-B1 1 issues GRANT 26 to BA 3 in cycle 11. In the same cycle, BU1-B2 4 puts the data to be stored on bus-2 24. In cycle 12, BA 3 drops its request 25, transferring the command received on bus-2 in cycle 3 to bus-1 29 and issuing CMD-valid 27. BA 3 further starts to issue TRANSFER DATA 22 for bus-2 in order to receive the data to be stored. This applies to cycles 12, 13, and 14. In cycle 13, BA 3 puts the first data on bus-1 29. BU2-B1 2 answers the command and sends TRANSFER DATA 28 in cycles 14, 15, and 16 to take data from bus-1. BA 3 drops GRANT 20 in cycle 15 after the first data on bus-1 was taken to indicate the end of the operation for bus-2.

Figure 4:
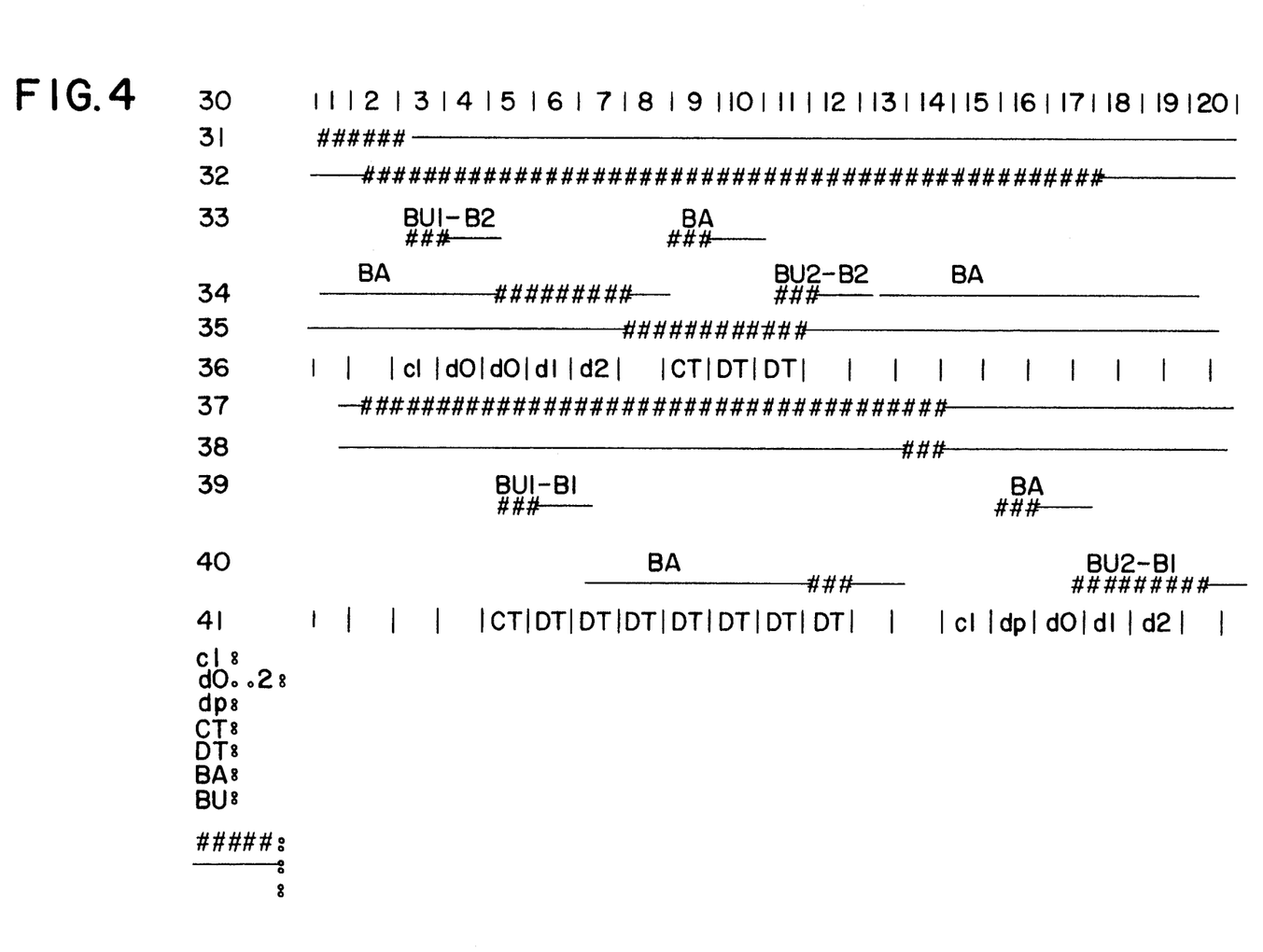
FIG. 4 is a timing diagram of a store sequence generated on bus-2 with control interference generated on bus-1 of FIG. 1.

FIG. 4 shows the protocol for a STORE and CONTROL started on both busses but for a different breakpoint. The top line 30 again refers to the system clock. The protocol starts with a request for bus-2 31 in the first cycle. In the 2nd cycle, BA 3 issues GRANT 32 and a request for bus-1 37. In the 3rd cycle, as a result of the GRANT, BU1-B2 4 drops the request 31, putting the command on bus-2 36 and issuing CMD-Valid 33. In the 4th cycle, BU1-B2 puts the data to be stored on bus-2 36. In the 5th cycle, BA 3 starts to receive the data and issues TRANSFER DATA 34, also for cycles 6 and 7. In cycle 5, BU1-B1 puts a command on bus-1 41 and issues CMD-Valid 39. In cycle 6, BA 3 detects the collision but cannot react as data transfer has already started. After the transfer is completed in cycle 8, BA 3 issues the SUSPEND signal 35. In the 9th cycle, BA 3 transfers the command received from bus-1 to bus-2 36 and activates CMD-Valid 33. In cycle 10, bus units on bus-2 4,5 interpret the command, while BA 3 transfers the data from bus-1 to bus-2. In cycle 11, BU2-B2 5 answers the command by activating TRANSFER DATA 34. In the 12th cycle, BA 3 deactivates SUSPEND 35 and activates TRANSFER DATA 40 on bus-1. After a wait cycle (cycle 13), BU1-B1 1 issues GRANT 38 to BA 3 in cycle 14. In cycle 15, BA 3 drops its request 37, transferring the command received on bus-2 in cycle 3 to bus-1 41 and issuing the CMD-valid 39. In cycle 16, BA 3 puts the first data on bus-1 41. BU2-B1 2 answers the command and sends Transfer-Data 40 in cycles 17, 18, and 19 to take data from bus-1. BA 3 drops GRANT 32 in cycle 18 after the first data on bus-1 was taken to indicate the end of the operation for bus-2.

Figure 5:
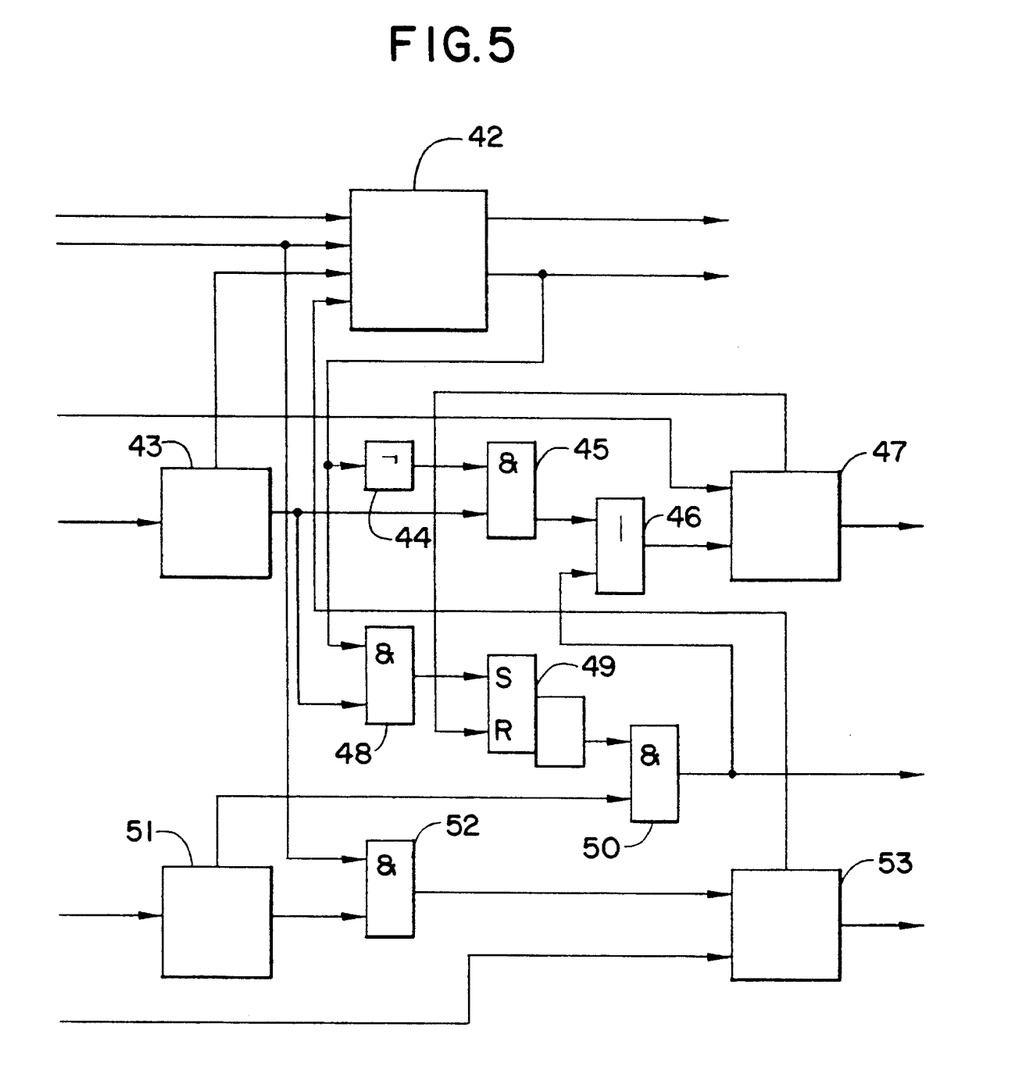
FIG. 5 is a schematic representation of a SUSPEND signal generation circuitry in accordance with the present invention.

FIG. 5 shows the circuitry to generate the SUSPEND signal and its connection to the control logic of BA 3. As previously stated, BA 3 can be master on both busses. It is always a master as a result of an operation on the other bus for which it is a slave. Therefore, BA 3 contains two slave controls 43, 51 and two master controls 47, 53. It also contains the arbiter 42 for bus-2. In a regular operation where BU1-B1 1 wants to communicate with a member of bus-2, the sequence will be as follows: CMD_Valid_BUS-1 will start bus-1 slave control 43. This will block arbiter 42 and put a '1' on AND-gate 45. As there is no request for bus-1 pending, the input to inverter 44 is '0' and the second input to gate 45 is '1'. The resulting '1' on the output of 45 is fed via OR-gate 46 to start bus-2 master-control 47. With each item of transfer data received on bus-2 the master-control is switched until the operation is completed. Slave control 43 will then release the lock for the arbiter 42.

An operation where BU1-B2 4 will communicate with BU2-B1 2 without collision works as follows: bus-2 is requested by arbiter 42. Unless blocked, arbiter 42 will grant bus-2 to the requestor and request bus-1. The CMD_Valid_BUS-2 will start bus-2 slave control, which puts a '1' on AND-gate 52. When the GRANT for bus-1 arrives, arbiter 42 will reset the REQ_BUS-1 signal. At the same time, AND-gate 52 will have a '1' on both inputs, thus starting bus-1 master control. With every TRANSFER_DATA_BUS-1 the master control 53 is switched. At the end of the operation, master control 53 sends a signal to arbiter 42 to drop the GRANT on bus-2. An operation where BU1-B2 4 wants to communicate with BU2-B1 2 but collides with an operation started on bus-1 works as follows: bus-2 is requested and arbiter 42 issues a GRANT as well as a REQ_BUS-1 signal. Via inverter 44, an active request blocks the direct path between controls 43 and 47. A CMD_VALID_BUS-1 still starts bus-1 slave control. Both inputs to AND-gate 48 are true and latch 49 will be set. AND-gate 50 operates as a function of the internal state of bus-2 slave control 51. Bus-2 slave control 51 will send a '1' to AND-gate 50 except for the period of Data Transfer in a store operation. So, if both inputs of the AND-gate 50 are true, the SUSPEND signal is active. Via OR-gate 46, bus-2 master control 47 is started. At the end of the operation, bus-2 master control 47 resets latch 49, again deactivating the SUSPEND signal. On receipt of the GRANT for bus-1, bus-1 master-control 53 is started via AND-gate 52 to complete the operation previously started on bus-2.

We claim:

1. A method for avoiding deadlocks in a computer system comprising a first bus, a first bus unit connected to said first bus, a second bus, a second bus unit connected to said second bus, and a bus adapter connected between said first and second busses, said method comprising the steps of:
   requesting by said first bus unit a first operation that requires use of both busses to complete;
   granting and acknowledging by said bus adapter to said first bus unit use of said first bus;
   after said granting and acknowledging steps but before completion of said first operation, requesting by said second bus unit a second operation that requires use of both busses to complete, and in response and said first bus unit's use of said first bus, granting said second bus unit use of both busses and completing said second operation; and
   after completing said second operation, said bus adapter resuming said first bus unit's use of said first bus, grating said first bus unit use of said second bus and resuming said first operation from its point of suspension until completion.

2. A method for avoiding deadlocks in a computer system comprising a first bus, a first bus unit connected to said first bus, a second bus, a second bus unit connected to said second bus, and a bus adapter connected between said first and second busses, said method comprising the steps of:
   requesting by said first bus unit a first operation that requires transfer of data across said first bus to said bus adapter and then from said bus adapter across said second bus to complete;
   granting by said bus adapter to said first bus unit use of said first bus;
   after said granting step, beginning transfer of said data across said first bus, but before completion of said transfer across said first bus, requesting by said second bus unit a second operation that requires use of both busses to complete, and in response, completing said transfer across said first bus and then said bus adapter suspending said first operation before starting transfer of said data across said second bus and then said bus adapter suspending said first bus unit's use of said first bus, granting said second bus unit use of both buses and completing said second operation; and
   after completing said second operation, said bus adapter granting said first bus unit use of said second bus and resuming said first operation from its point of suspension until completion.

3. A method as set forth in claim 2 further comprising the step of said bus adapter resuming said first bus unit's use of said first bus after completing said second operation in order to complete said first operation.

4. A computer system for avoiding deadlocks, said system comprising:
   a first bus and a first bus unit coupled to said first bus;
   a second bus and a second bus unit coupled to said second bus;
   bus adapter means, connected between said first and second busses, for controlling use of both busses; and
   means for requesting by said first bus unit a first operation that requires use of both busses to complete, said bus adapter means granting use by said first bus unit of said first bus;

means, after the granting bus before completion of said first operation, for requesting by said second bus unit a second operation that requires use of both busses to complete; and wherein said bus adapter means responds to said second bus unit request by suspending said first operation and said first bus unit's use of said first bus, granting said second bus unit use of both busses and completing said second operation and then granting said first bus unit use of said second bus and resuming said first operation from its point of suspension unit completion.

5. A computer system as set forth in claim 4 wherein said first operation requires transfer of data across said first bus to said bus adapter means and then from said bus adapter means across said second bus unit;

said first bus unit begins transfer of said data across said first bus after the granting;

said second bus unit makes its request after start but before completion of said transfer across said first bus;

said first bus unit and said bus adapter means complete said transfer across said first bus, and then said bus adapter means suspends said first operation before starting transfers of said data across said second bus, grants said second bus unit use of both buses, completes said second operation, grants said first bus unit use of said second bus and resumes said first operation from its point of suspension unit completion.

6. A method for avoiding deadlocks in a computer system comprising a first bus, a first bus unit coupled to said first bus, a second bus, a second bus unit coupled to said second bus, and a bus adapter connected between said first and second busses, said method comprising the steps of:

requesting by said first bus unit a first operation that requires use of both busses to complete;

granting by the bus adapter use of said first bus to said first bus unit and beginning by said bus adapter a sequence of steps to implement said first operation;

after said beginning steps but before completion of said first operation, requesting by said second bus unit a second operation that requires use of both busses to complete, and in response, said bus adapter suspending said first operation, granting said second bus unit use of both buses and completing said second operation; and after completing said second operation, said bus adapter granting said first but unit use of said second bus and resuming said first operation from its point of suspension until completion.

7. A method as set forth in claim 6 wherein said suspending step comprises the step of suspending said first bus unit's use of said first bus.

8. A method as set forth in claim 7 further comprising the step of resuming said first bus unit's use of said first bus after the step of completing said second operation.

* * * * *

UNITED STATES PATENT AND TRADEMARK OFFICE
CERTIFICATE OF CORRECTION

PATENT NO. : 5,355,455
DATED : October 11, 1994
INVENTOR(S) : R. Hilgendorf et al It is certified that error appears in the above-identified patent and that said Letters Patent is hereby corrected as shown below:

Column 6, line 23, please change "grating" to "granting".

Signed and Sealed this

Seventeenth Day of January, 1995

Attest:

BRUCE LEHMAN

Attesting Officer        Commissioner of Patents and Trademarks